United States Patent [19]
Conary et al.

[11] Patent Number: 5,537,581
[45] Date of Patent: Jul. 16, 1996

[54] MICROPROCESSOR WITH A CORE THAT OPERATES AT MULTIPLE FREQUENCIES

[75] Inventors: James W. Conary, Aloha; Robert R. Beutler, Lake Oswego, both of Oreg.

[73] Assignee: Intel Corporation, Santa Clara, Calif.

[21] Appl. No.: 36,441

[22] Filed: Mar. 24, 1993

Related U.S. Application Data

[63] Continuation-in-part of Ser. No. 778,575, Oct. 17, 1991.
[51] Int. Cl.⁶ ........................................... G06F 1/08
[52] U.S. Cl. .................. 395/550; 364/270; 364/270.2; 364/273.1; 364/DIG. 1
[58] Field of Search .................. 395/375, 550, 395/800, 750; 364/270, 270.2, 273.1

[56] References Cited

U.S. PATENT DOCUMENTS

| | | | |
|---|---|---|---|
| 4,095,267 | 6/1978 | Morimoto . | |
| 4,405,898 | 9/1983 | Flemming . | |
| 4,893,271 | 1/1990 | Davis et al. | 364/900 |
| 4,980,836 | 12/1990 | Carter et al. | 364/483 |
| 5,025,387 | 6/1991 | Frane | 364/493 |
| 5,041,962 | 8/1991 | Lunsford | 364/200 |
| 5,077,686 | 12/1991 | Rubenstein . | |
| 5,167,024 | 11/1992 | Smith et al. | 395/375 |
| 5,175,853 | 12/1992 | Kardach et al. | 395/650 |
| 5,191,657 | 3/1993 | Ludwig et al. | 395/325 |
| 5,263,172 | 11/1993 | Olnowich | 395/800 |
| 5,276,824 | 1/1994 | Skruhak et al. | 395/375 |
| 5,305,452 | 4/1994 | Khan et al. | 395/550 |
| 5,336,939 | 8/1994 | Eitrheim et al. | 307/269 |
| 5,359,232 | 10/1994 | Eitrheim et al. . | |
| 5,392,437 | 2/1995 | Matter et al. | 395/750 |

FOREIGN PATENT DOCUMENTS 0242010  12/1987  European Pat. Off. .

OTHER PUBLICATIONS

Shanley et al., "ISA System Architecture", 1991, pp. 1–4 and 17–23.

Primary Examiner—Kevin A. Kriess
Assistant Examiner—Dennis M. Butler
Attorney, Agent, or Firm—Blakely, Sokoloff, Taylor & Zafman

[57] ABSTRACT

A microprocessor that operates at the speed of the bus or at a speed which is a multiple of the bus speed on a selectable basis. The microprocessor includes a phase locked loop to generate clock signals to clock the operations within the microprocessor and bus clock signals to clock data transfer operations between the microprocessor and the bus.

16 Claims, 9 Drawing Sheets

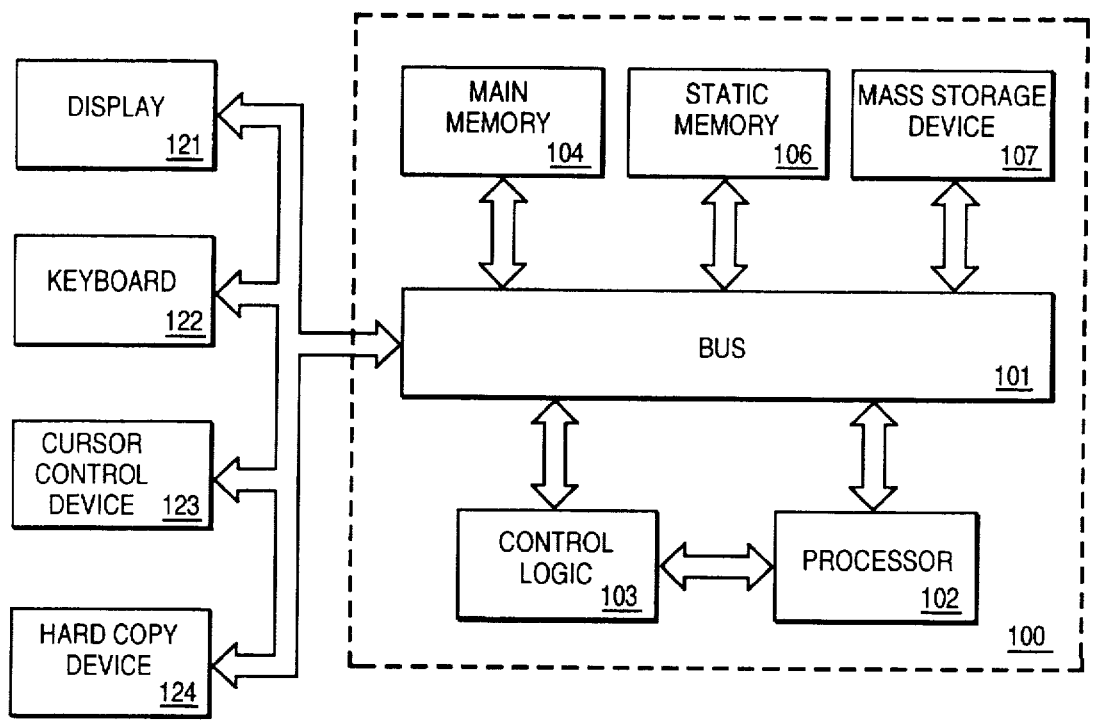
FIG_1

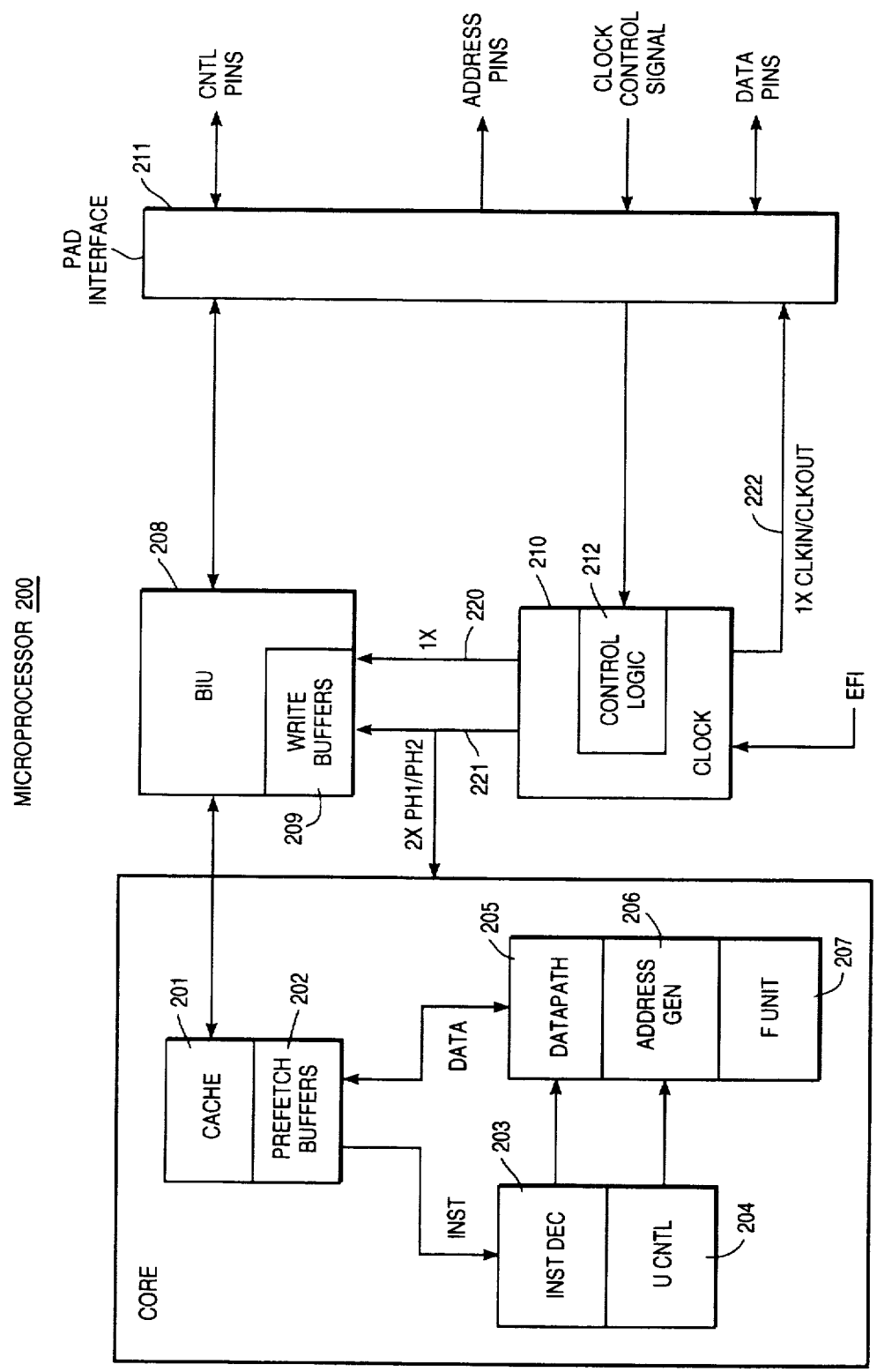

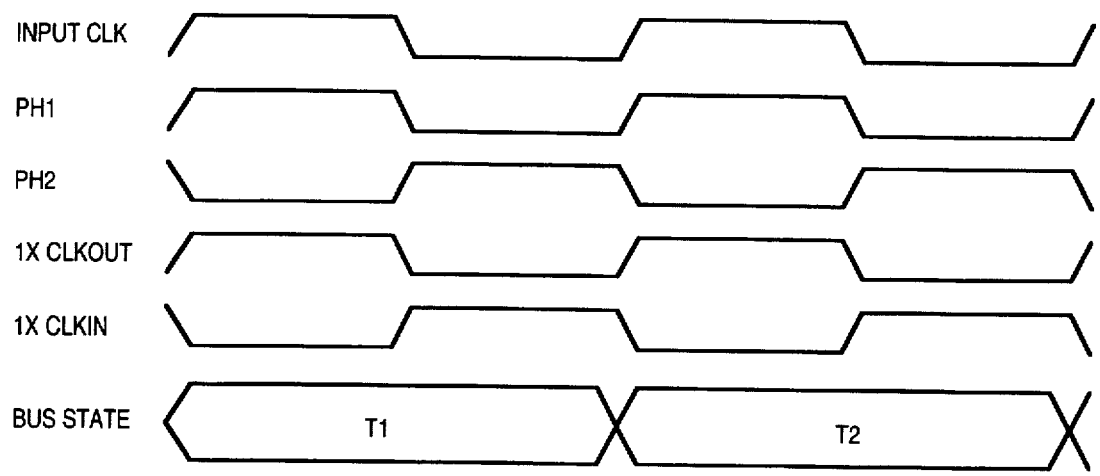
FIG_3
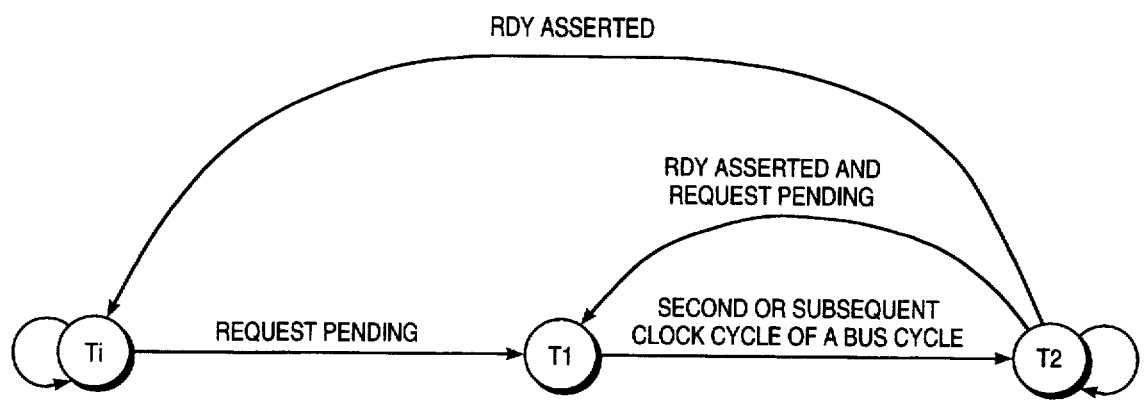
FIG_4

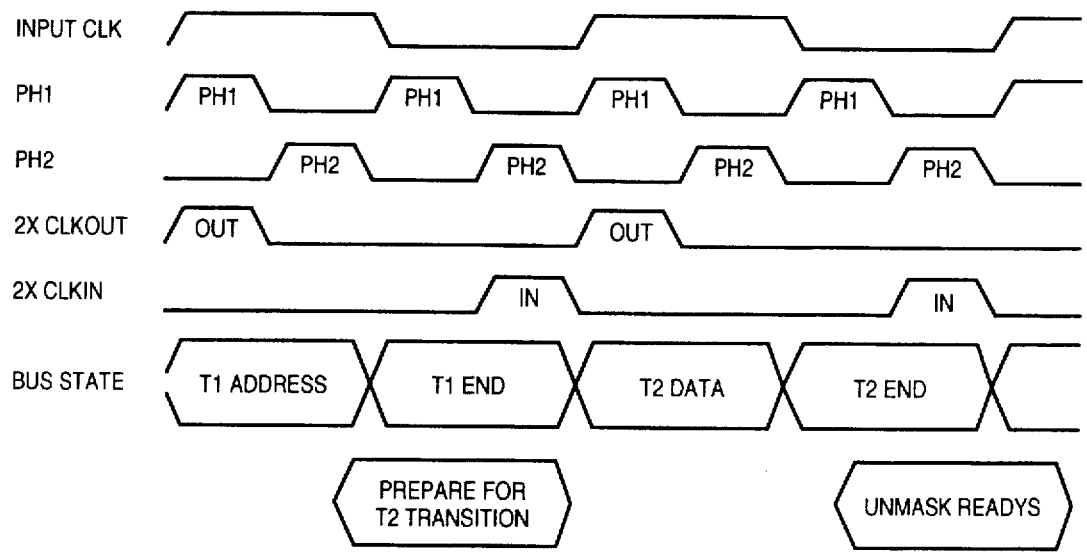
FIG_5
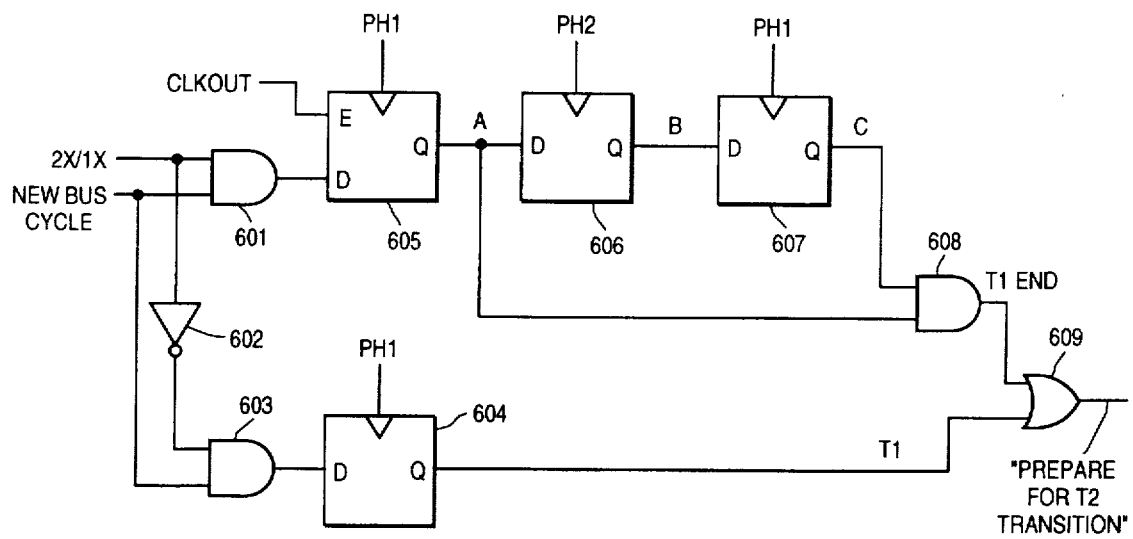
FIG_6

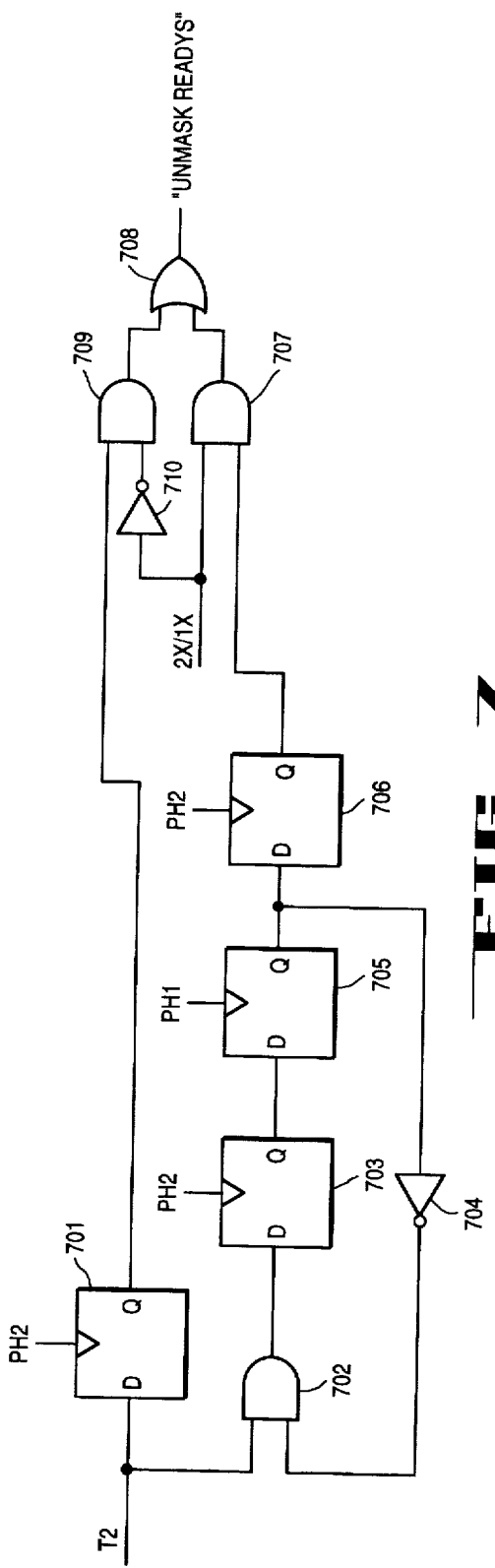
FIG_7
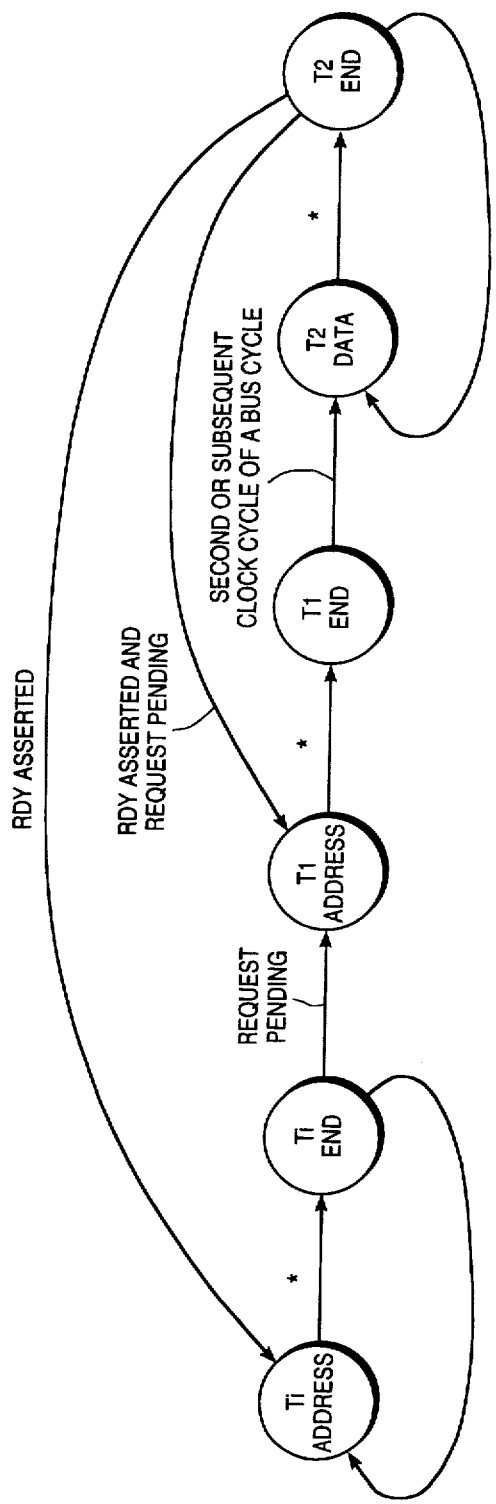
FIG_8

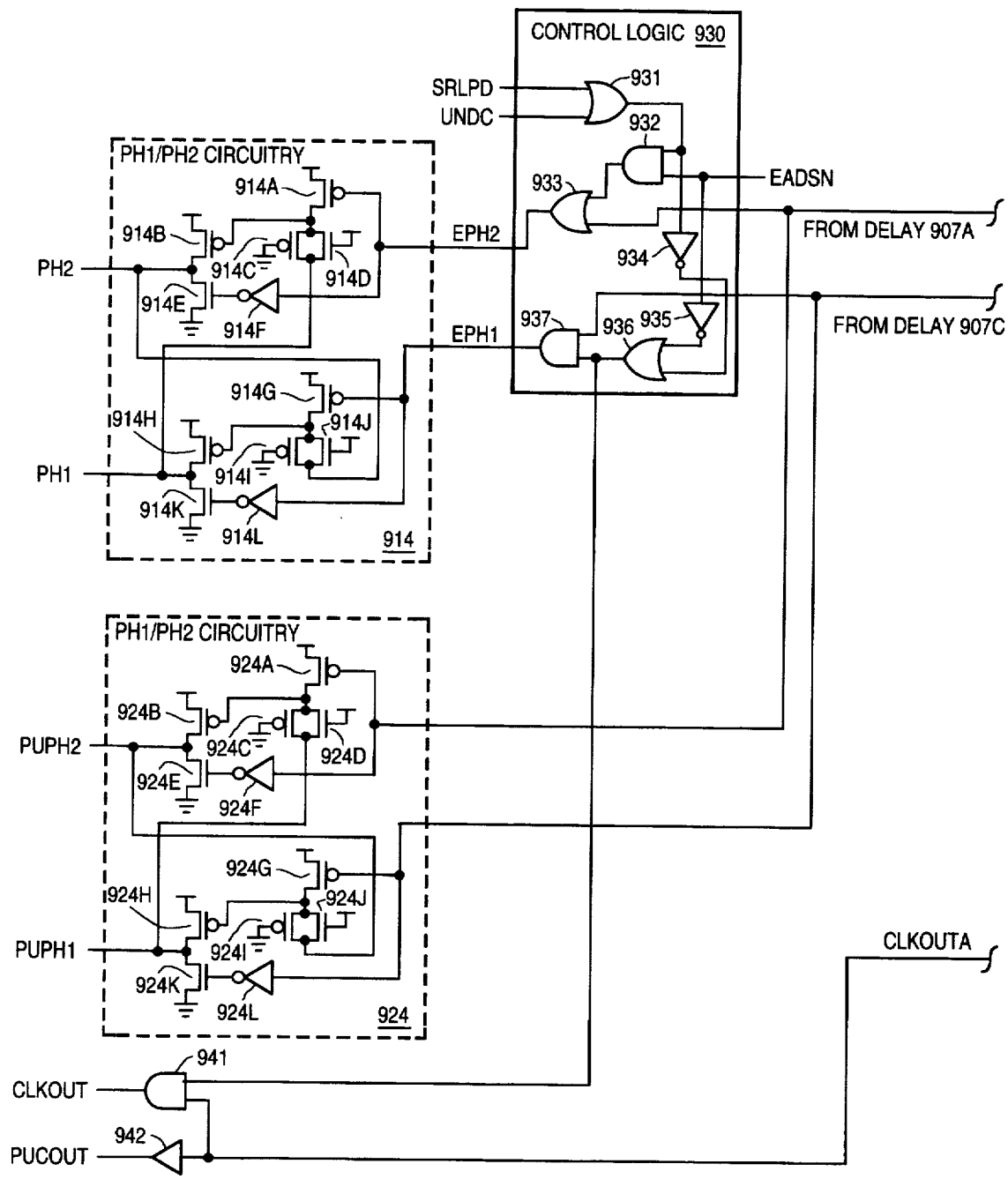
FIG_9A

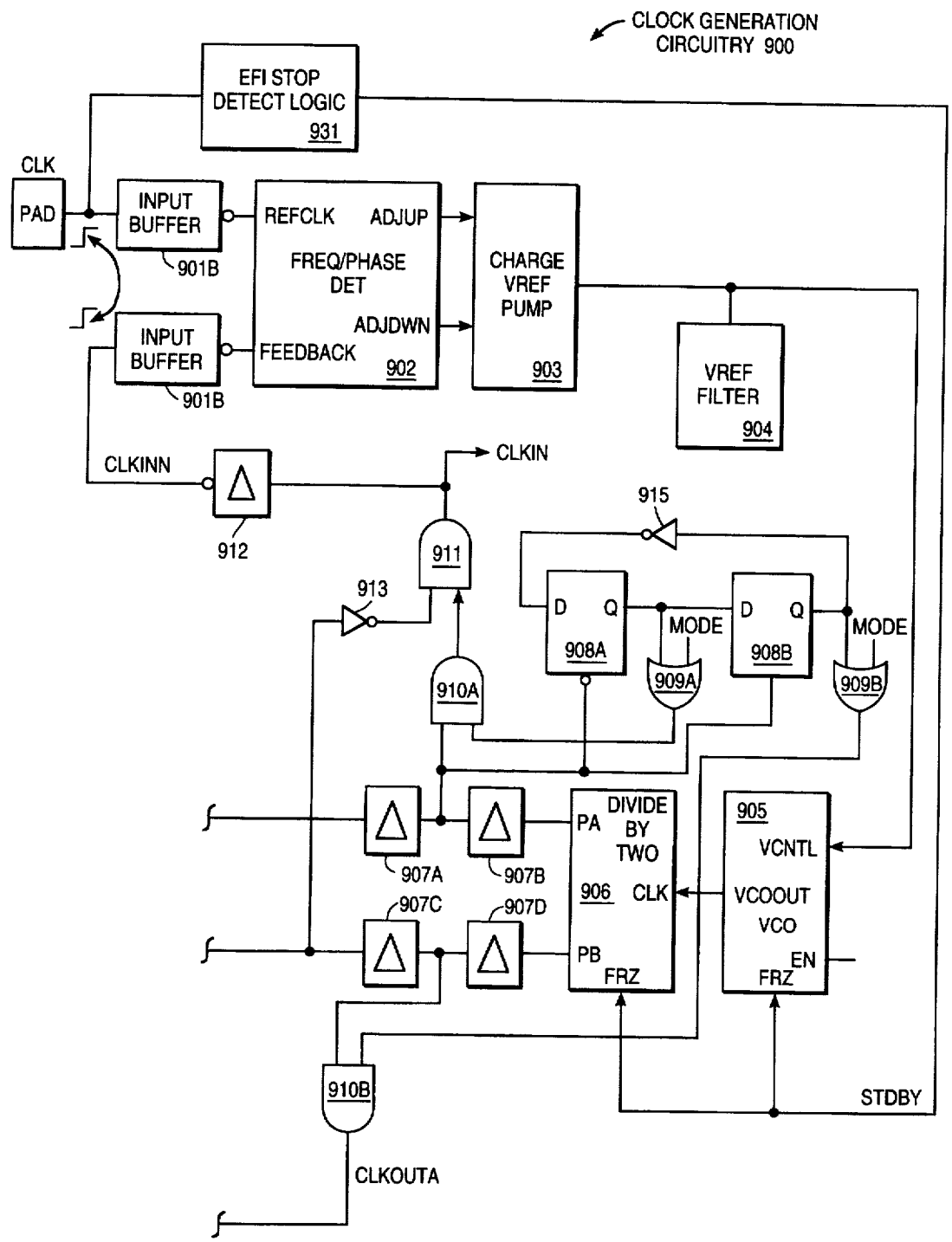
FIG_9B

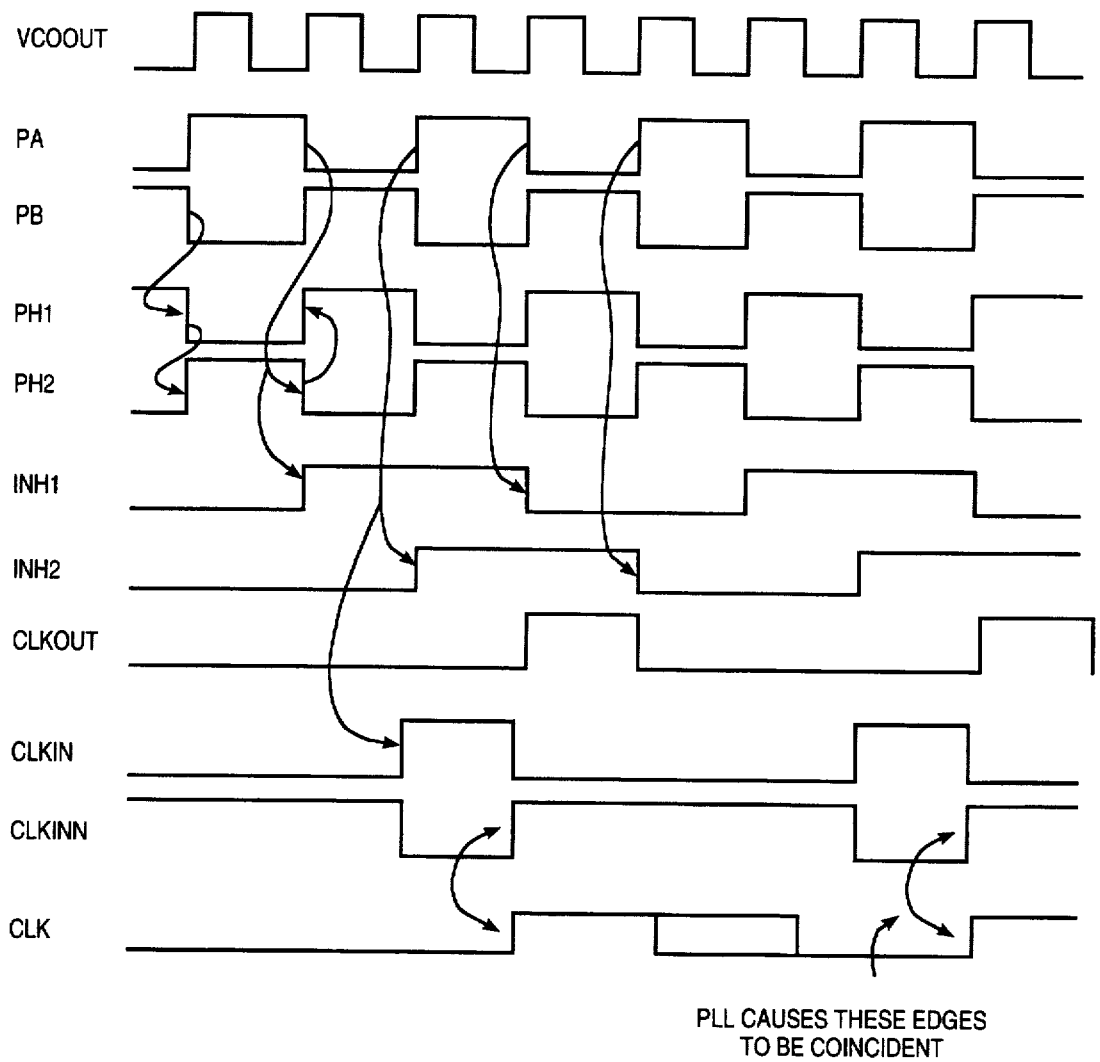
FIG_10

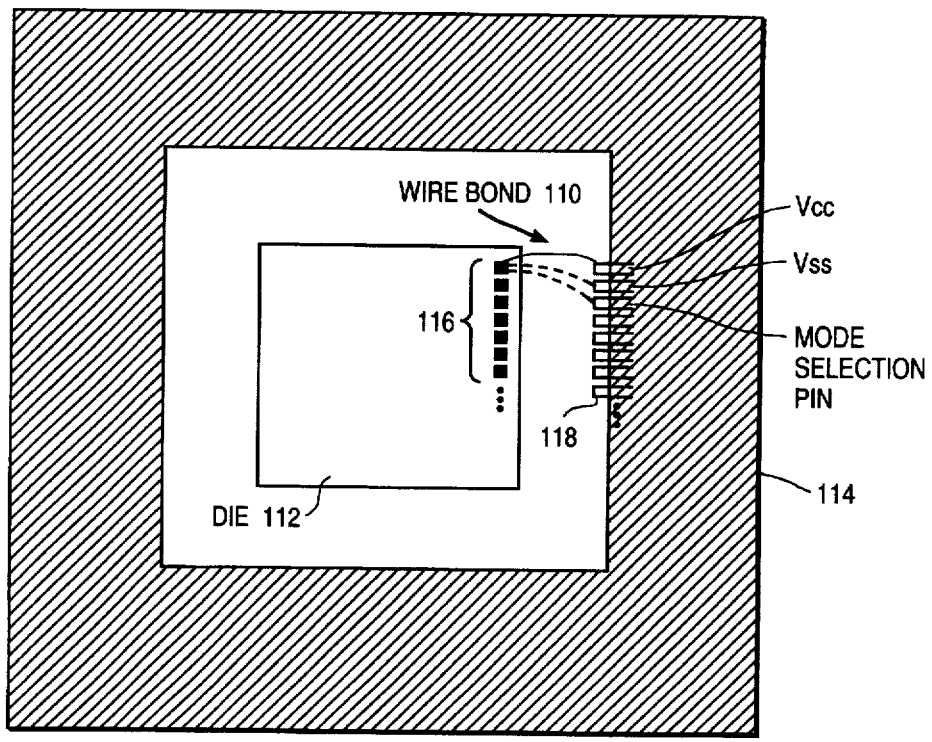
FIG_11
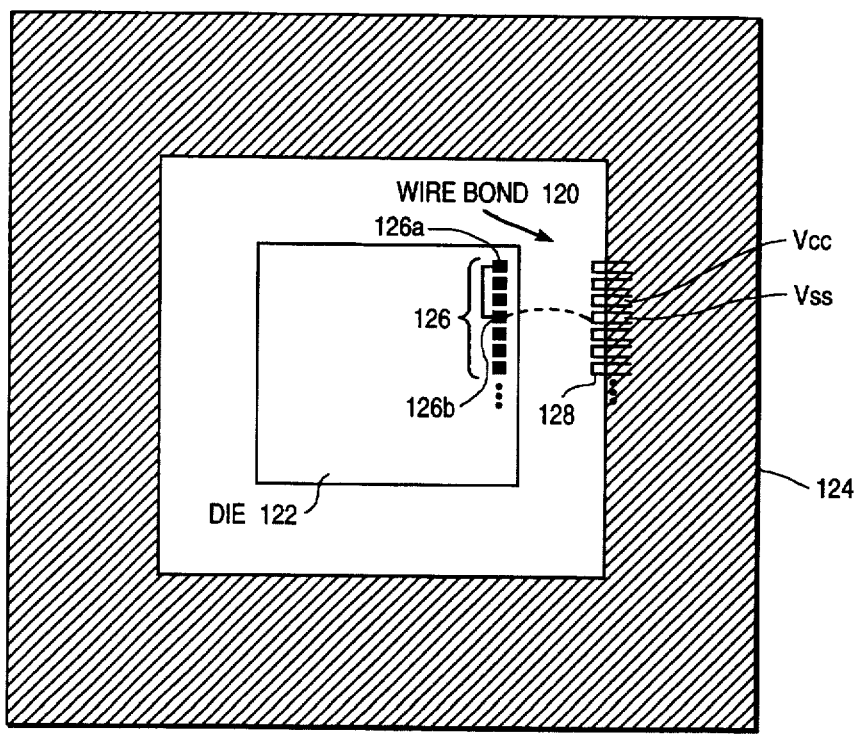
FIG_12

MICROPROCESSOR WITH A CORE THAT OPERATES AT MULTIPLE FREQUENCIES

This is a continuation-in-part application of co-pending application entitled, "Microprocessor Having A Core Which Operates At Twice The Frequency Of The Input Clock Of The Microprocessor", Ser. No. 07/778,575, filed on Oct. 17, 1991.

FIELD OF THE INVENTION

The present invention relates to the field of computers and computer systems. More specifically, the invention relates to features incorporated within a computer system or within a microprocessor for controlling clocking signals.

BACKGROUND OF THE INVENTION

Typically, a computer system contains a processor, a bus, and other peripheral devices. The processor is responsible for executing instructions using the data in the computer system. The bus is used by the microprocessor and the peripheral devices for transferring information between one another. The information on the bus usually includes data, address and control signals. The peripheral devices comprise storage devices, input/output I/O devices, etc. Generally, all operations being performed in the computer system occur at the same frequency.

The microprocessor has a core for processing the data. Since generally all operations performed by the computer system occur at the same frequency, the logic operations performed by the core are at the same frequency as the transfer of data, address and control signals on the computer system bus.

Some logic operations performed by the core, such as arithmetic operations, require multiple cycles to complete. During completion of these multiple cycle operations, the bus remains idle. It is desirable to have the core operate at a faster speed than the bus, so that operations are performed more quickly. In this manner, the bus will be used more frequently, such that bus idle states will be reduced and operations performed more quickly.

When additional features are integrated in a microprocessor, its use must often require changes to the computer system to accommodate the new features. These changes could take the form of modifications to the circuit board, including adding extra circuitry. Changes which require modifications to the bus architecture including the bus width are generally expensive. Ideally, new features and faster processing should be added without changing, for example, the mother board of a computer system. It is thus advantageous to modify microprocessors by incorporating new features in such a way as to reduce or dispense with changes to the remainder of the computer system.

The present invention provides a microprocessor design which can have its core operate at a multiple (e.g., 2x, 3x, etc.) of the bus frequency. Thus, the present invention provides a microprocessor with a core that operates at multiple frequencies of the computer system bus transparently, such that the computer system does not know the core is operating faster and, thus, does not have to be changed to accommodate the microprocessor of the present invention. In this manner, the microprocessor of the present invention allows an upgrade to performance without having to redesign the personal computer board within the system.

SUMMARY OF THE INVENTION

A microprocessor having a core which operates at multiple frequencies on a selectable basis is described. The microprocessor device of the present invention is formed in a single integrated circuit chip and includes a CPU core, a bus control unit, a clock generator and a clock control. The CPU core executes instructions and operates at a clock speed responsive to core clock signals which are applied to its clock input. The bus control unit transfers data between terminals of the device and the CPU core and operates at a clock speed responsive to bus clock signals applied to its clock input. The clock generator receives a signal of a first frequency and generates the core clock signals and the bus clock signals applied to the clock inputs of the core and bus respectively. The bus clock signals are of a first frequency. The clock control has a first condition and a second condition, wherein the first condition causes the clock generator to produce the core clock signals at a second frequency which is a multiple of the first frequency, and the second condition causes the clock generator to produce core clock signals at the first frequency.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a block diagram of the computer system of the present invention.

FIG. 2 is a block diagram of the currently preferred embodiment of the microprocessor of the present invention.

FIG. 3 illustrates the timing signals generated by the clock generator of the currently preferred embodiment of the present invention for the 1x core mode.

FIG. 4 is a bus state diagram for the 1x core mode.

FIG. 5 illustrates the timing signals generated by the clock generator of the currently preferred embodiment of the present invention for the 2x core mode.

FIG. 6 illustrates one embodiment of the logic circuitry for generating the "prepare for T2 transition" logic signal.

FIG. 7 illustrates one embodiment of the logic circuitry for generating the "unmask readys" logic signal.

FIG. 8 is a bus state diagram for the 2x core mode.

FIGS. 9A and 9B are a circuit schematic of the clock generator of the currently preferred embodiment of the present invention.

FIG. 10 illustrates the timing signals associated with the phase locked loop of the present invention.

FIG. 11 illustrates the selection of the operating mode of the present invention of the computer by a wire bond.

FIG. 12 illustrates the selection of the operating mode of the present invention by metal option.

DETAILED DESCRIPTION OF THE INVENTION

A method and apparatus for selecting the operating frequency of a microprocessor is described. In the following description, numerous specific details are set forth such as specific numbers of signals, gates, frequencies, etc., in order to provide a thorough understanding of the present invention. It will be obvious, however, to one skilled in the art that the present invention may be practiced without these specific details. In other instances, well-known computer operations and components have been shown in block diagram form, rather than in detail, to avoid unnecessarily obscuring the present invention.

Overview of the Computer System of the Present Invention

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 1, a computer system, as may be utilized by the preferred embodiment of the present invention, generally comprises a bus or other communications means 101 for communicating information, a processor 102 coupled with bus 101 for processing information, a random access memory (RAM) or other dynamic storage device 104 (commonly referred to as a main memory) coupled with bus 101 for storing information and instructions for processor 102, a read only memory (ROM) or other static storage device 106 coupled with bus 101 for storing static information and instructions for processor 102, a data storage device 107, such as a magnetic disk and disk drive, coupled with bus 101 for storing information and instructions.

The computer system also includes a display device 121, such as a cathode ray tube, liquid crystal display, etc., coupled to bus 101 for displaying information to the computer user, an alphanumeric input device 122 including alphanumeric and other keys, etc., coupled to bus 101 for communicating information and command selections to processor 102 and a cursor control device 123 coupled to bus 101 for controlling cursor movement. Moreover, the system includes a hard copy device 124, such as a plotter or printer, for providing a visual representation of the computer images. Hard copy device 124 is coupled with processor 102, main memory 104, static memory 106 and mass storage device 107 through bus 101.

The computer system also includes control logic 103 coupled to bus 101 and processor 102 for selecting the operating frequency of processor 102. In one embodiment, control logic 103 includes a signal to set processor 102 in either of two modes, wherein in one mode processor 102 operates at the same frequency as the computer system and in another mode processor 102 operates at a frequency which is a multiple of the computer system (i.e., the frequency of bus 101).

Of course, certain implementations and uses of the present invention may not require nor include all of the above components. For example, in certain implementations a keyboard and cursor control device for inputting information to the system may not be required. In other implementations, it may not be required to provide a display device for displaying information.

Overview of the Processor of the Present Invention

FIG. 2 shows a block diagram of the processor, processor 200, utilized by the preferred embodiment of the present invention. Processor 200 is preferably manufactured as an integrated circuit using a metal-oxide-semiconductor (MOS) process. Referring to FIG. 2, processor 200 generally comprises cache 201, prefetch buffers 202, instruction decoder 203, microcode unit 204, datapath 205, address generator 206, floating-point unit 207, bus interface unit (BIU) 208, write buffers 209, clock generator 210 and pad interface 211. All of the units of the processor except the bus controller in BIU 208 constitute the core of processor 200.

Pad interface 211 is coupled to clock generator 210 and BIU 208 and provides a pin interface for control, address and data signals between processor 200 and the remainder of the computer system. BIU 208 includes the bus controller and provides the necessary interface between the internal buses of processor 200, and in particular cache memory 201 and prefetch buffers 202 and the external buses responsible for fetching data from the external data memory system. In the currently preferred embodiment, the present invention uses an external 32-bit address bus and a 32-bit data bus. BIU 208 is also coupled to write buffers 209 which provide a buffer storage area for data which is to be transferred from processor 200 to the remainder of the computer system. In the currently preferred embodiment, write buffers 209 provide buffer storage for data which is transferred off-chip. BIU 208 is coupled to receive clock signals from clock generator 210 on line 220 and line 221. Note that in the currently preferred embodiment, only those portions of BIU 208 that interface with pad interface 211 operate at the same frequency, while the remainder operates at twice the frequency (i.e., the frequency of the core).

Cache 201 stores instructions and data for execution by processor 200. Prefetch buffers 202 is coupled to cache 201 and is responsible for prefetching data and instructions from cache 201 or from BIU 208 for use in execution by processor 200.

Instruction decoder 203 decodes the incoming instructions. Instruction decoder 203 is coupled to receive the instructions from prefetch buffers 202 and sends the decoded instructions, in the form of microcode, to datapath 205 for execution. Microcode unit 204 contains a memory (CROM) which stores the microcode instructions (microcode) for the processor. Microcode unit 204 is coupled to instruction decoder 203 and shares control of instruction execution with instruction decoder 203 in a manner well-known in the art. Microcode unit 204 provides address generator 206 with address information which address generator 206 uses to generate addresses corresponding to data necessary in the execution of the decoded instructions. Address generator 206 provides the addresses for either datapath 205 or floating point 207 depending on the instruction type.

Microcode unit 204 is also responsible for instruction boundary processing, such as interrupt/exception arbitration, and the halting of instruction decoder 203 when necessary. Microcode unit 204 is also responsible for handling most of the freeze conditions, such as cache memory miss, etc.

Datapath 205 is the main execution data path for the processor. Datapath 205 contains the arithmetic logic unit, register file, barrel shifter, constant read-only memory (ROM) and flags. Datapath 205 is coupled to prefetch buffers 202 and requests data from cache 201, via prefetch buffers 202. Datapath 205 executes the microcode provided by instruction decoder 203 using the data received from prefetch buffers 202 according to the addresses generated by address generator 206.

Processor 200 also includes floating point unit 207, which is coupled to address generator 206. Floating point unit 207 contains logic to execute the floating point instructions.

Clock generator 210 generates the clock signals for processor 200. In the present invention, clock generator 210 generates the clock signals in response to an external frequency clock input (EFI) signal, which it is coupled to receive. In the currently preferred embodiment, the EFI clock signal has a frequency of 33 MegaHertz (MHz). Clock generator 210 supplies the clock signals to BIU 208 via bus (i.e., I/O) clock signal line 220 and the remainder of units in processor 200 via core clock signal line 221. Clock generator 210 sends clock signals to pad interface 211 via lines 222. Clock generator 210 includes control logic 212 for controlling the operation of clock generator 210. In the present invention, clock control logic 212 includes logic for disabling and enabling some of the clock signals produced by clock generator 210, such that clock generator 210 does not output those clock signals. Clock control logic 212 is also responsible for controlling the frequency of the core clock signals of line 221 in comparison of the bus (i.e., I/O) clock signals 220 and the clock signals 222 output to pad interface 211.

The block diagram of FIG. 2 is realized with ordinary circuits. Control signals not required for an understanding of the present invention are not illustrated in FIG. 2. Additionally, functions not required for an understanding of the present invention are not shown in order to facilitate an understanding of the invention. Note also that some lines may comprise multiple conductors.

Clock Signals of the Present Invention

Clock generator 210 of the present invention provides core clock signals and bus clock signals for processor 200. The core clock signals clock the operations performed by the units which constitute the core, including the bus controller. In the currently preferred embodiment, the core clock signals are referred to as phase one (PH1) and phase two (PH2). The bus clock signals clock the transfer of data occurring on the computer system bus. Data transfers occur in two clock phases. During an out phase, data is driven out onto the bus, while during an in phase, data is driven into processor 200 from the bus. In the currently preferred embodiment, the bus clock signals generated by clock generator 210 corresponding to the out and in phases are the CLKOUT and CLKIN signals respectively (line 222). Note that in the currently preferred embodiment, all external timing parameters are specified with respect to the rising edge of the external clock input (EFI).

In the present invention, clock generator 210 has multiple modes of operation. In one mode, clock generator 210 is capable of providing core clock signals at the same frequency as the bus clock signals. This is referred to herein as the 1× mode. In another mode, clock generator 210 provides core clock signals at a frequency which is a multiple of the bus clock signals. In other words, clock generator 210 of the present invention is capable of providing core signals which are two times (2×), three times (3×), four times (4×), etc. the frequency of the bus clock signals. In the currently preferred embodiment, clock generator 210 of the present invention provides core clock signals at the same frequency as the bus clock signals in one mode (i.e., the 1× mode) and provides core clock signals at two times (2×) the frequency of the bus clock signals in another mode (i.e., the 2× mode).

In the currently preferred embodiment, in the 1× mode the core clock signals and the bus clock signals are at the frequency of the EFI, which is 33 MHz. Thus, the bus clock signal, CLKOUT and CLKIN, are the same as the core clock signals, PH1 and PH2 (with the exception of a small delay). In the currently preferred embodiment, in the 2× mode, the core clock signals are at 66 MHz and the bus clock signals are at 33 MHz. To reiterate, the core clock signals control the operation of the core of processor 200 including the bus controller in BIU 208. Thus, in the currently preferred embodiment, during the 2× mode, all portions of the core are operating at 2× the input clock frequency (i.e., EFI) including the bus controller. Only a small portion of BIU 208 has an indication that the bus is operating at the same frequency of the EFI (e.g., 33 MHz).

The mode of clock generator 210 is determined according to a clock control signal. In the currently preferred embodiment, the clock control signal indicates whether clock generator 210 operates in the 1× or 2× mode.

In order for a processor to be able to operate at both 1× and 2× modes of operation, the bus input and output clock implementation has a particular timing relationship, which allow for a straightforward 1× bus frequency to 2× core frequency interface. To reiterate, in 2× mode, the core and the bus controller operate at twice the input clock frequency. It should be noted that in the present invention, the bus controller operates at 2× the input clock frequency to allow the write buffers to be loaded at a rate of up to one load per core clock. Therefore, the write buffers are loaded whether or not the bus is ready and each write is completed as the bus becomes available. In this manner, the core is able to continue operating without having to wait for the slower bus. Also in the currently preferred embodiment of the present invention, in order to make the 1× bus to 2× core interface straightforward, the architecture of processor 200 is designed in a such a manner as to provide a very contained 1×/2× boundary. The boundary between the 1× bus and 2× core is contained by interfacing BIU 208 with cache 201 only.

With respect to the clock signals, in the 2× mode of the present invention, the PH1 and PH2 core clock signals have a timing relationship with respect to the CLKIN and CLKOUT bus clock signals, such that the I/O buffers can communicate properly with the core of the processor. In the 2× mode of the currently preferred embodiment, the CLKOUT and CLKIN signals are quarter duty cycle and are offset with respect to each other. That is, during the 2× mode, bus clock signals, CLKOUT and CLKIN, are quarter duty cycle clock signals that are synchronized with every other core clock signal PH1 and PH2 respectively. In the currently preferred embodiment, since the original phase high time of the 2× mode core phases, PH1 and PH2, are utilized by the 1× mode bus clock signals, CLKOUT and CLKIN, and the phases of the bus clock signals are aligned with the beginning and ending of the 2× core clock signals, the circuitry required to drive the half speed bus is reduced.

Note that quarter duty cycles are distinguished from half duty cycles in which the high and low times for the signal are equal. In quarter duty cycle signals, the high and low times for the signal are not even, such that the high or low time is only one quarter the total time for a high/low transition. Note that in the currently preferred embodiment of the present invention, the pulse width of the core clock signals is equal to the pulse width of the bus clock signals regardless of whether the core clock signals are 1×, 2×, 3×, 4×, etc. the frequency of the bus clock signals.

The Clock Signals of the Present Invention

The timing signals generated by the currently preferred embodiment of clock generator 210 during 1× mode are shown in FIG. 3. Referring to FIG. 3, the input clock signal CLK (i.e., EFI) is shown. PH1 and PH2 are the 1× core clock signals. Note that the PUPH1 and PUPH2 clock signals are not shown but are the same as the PH1 and PH2 core clock signals. The CLKOUT and CLKIN signals are the bus clock signals that are synchronized with every other PH1 and PH2 core clock signal respectively.

FIG. 3 also shows the BUS STATE for the computer system of the present invention during 1× mode. The bus cycle starts at T1 when the addresses are driven out onto the computer system bus when the CLKOUT signals transition high. The bus controller then uses logic to set up a transition from T1 to T2 during the PH2 core clock signals of T1. At the start of T2, data is driven onto the computer system bus when the CLKOUT signal transitions high if the cycle is a write cycle; otherwise, nothing occurs during the CLKOUT high state. During T2, data is returned from the computer system bus during the CLKIN phase. The data is used if a ready signal indicates that the data is good. At this state, the bus controller can transition to either new T2, a new T1 or an idle state depending on the cycle type. FIG. 4 illustrates the bus state diagram for the 1× core mode. Referring to FIG. 4, state Ti corresponds to the idle state, such that while the processor is idle or enters the idle state the bus state transitions to state Ti. The bus state machine transitions to state T1 when a request is pending. This occurs at the first clock cycle of a bus cycle. As stated above, in the T1 state, addresses are driven out onto the computer system bus when CLKOUT goes high. From the T1 state, the state machine transitions to the T2 state at the second or subsequent clock cycle of a bus cycle. Once in the T2 state, if the cycle is a write cycle, then the data is driven onto the computer system bus when CLKOUT transitions. If the cycle is a read cycle, data is returned from the system bus during CLKIN. Also, during the T2 state, the ready signal is sampled. If the ready signal is asserted and no request for the bus is pending, then the state machine transitions to the Ti state. If the ready signal is asserted and a bus request is pending, then the state machine transitions to the T1 state.

The timing signals generated by the currently preferred embodiment of clock generator 210 during 2× mode are shown in FIG. 5. Referring to FIG. 5, the input clock signal CLK (i.e., EFI) is shown. The PH1 and PH2 are the core clock signals. Note that the PUPH1 and PUPH2 clock signals are not shown but are the same as the PH1 and PH2 core clock signals. The CLKOUT and CLKIN signals are quarter duty cycle bus clock signals. Note that the CLKOUT and CLKIN signals are synchronized with every other PH1 and PH2 core clock signal respectively.

FIG. 5 also shows the BUS STATE for the computer system of the present invention. The bus cycle starts at T1 ADDRESS when the addresses are driven out onto the computer system bus when the CLKOUT signals transition high. It should be noted that T1 is split into two states, T1 ADDRESS and T1 END. This effectively adds a wait cycle to T1. The present invention includes logic to prevent the bus controller from realizing that it is in T1 during the T1 ADDRESS time. At T1 END, the bus controller determines that it is in T1. For this case, when the core is operating at twice the speed of the bus, if the bus controller were not modified, it would attempt to transition from T1 ADDRESS to T2 instead of T1 END. The bus controller now sets up a transition from T1 to T2 during the PH2 core clock signals of T1 END. At the start of T2 DATA, data is driven onto the computer system bus when the CLKOUT signal transitions high if the cycle is a write cycle; otherwise, nothing occurs during the CLKOUT high state. During T2 END, data is returned from the computer system bus during the CLKIN phase. The data is used if a ready signal indicates that the data is good. At this state, the bus controller can transition to either new T2, a new T1 or an idle state depending on the cycle type.

The bus controller of the present invention is modified with the addition of a holdoff signal which holds off the initiation of the transition from the T1 state to the T2 state until the end of T1 END. In the present invention, the hold off is accomplished with the addition of "prepare for T2 transition" logic signal, which is shown in FIG. 5. The timing of the external ready signals is critical to the operation of the state machines of the bus controller. Furthermore, in the present invention, circuitry masks ready inputs until the "unmask readys" period occurs as shown in FIG. 5. The additional logic required to accomplish the hold off is very minimal. Using the hold off circuitry allows the present invention to interface processor 200 with the computer system bus in 2× mode without having to include additional output drivers and input latches.

FIG. 6 illustrates one embodiment of the "prepare for T2 transition" holdoff logic. Referring to FIG. 6, logic 600 comprises D flip-flops 604–607, AND gates 601, 603 and 608, inverter 602 and OR gate 609. One input to AND gate 601 is the 2×/1× core mode indication signal. The other input is the new bus cycle signal which indicates when a new bus cycle occurs. The output of AND gate 601 is coupled to the D input of flip-flop 605. The enable input (E) of flip-flop 605 is also coupled to the CLKOUT bus clock signal. Flip-flop 605 is clocked by the PH1 core clock signal. The Q output of flip-flop 605 is coupled to the D input of flip-flop 606, which is clocked by the PH2 core clock signal. The Q output of flip-flop 606 is coupled to the D input of flip-flop 607, which is clocked by the PH1 core clock signal. The Q output of flip-flop 607 is coupled to one of the inputs of AND gate 608. The other input to AND gate 608 is coupled to the output of flip-flop 605. The output of AND gate 608 is coupled to one of the inputs of OR gate 609. The other input to OR gate 609 is coupled to the Q output of flip-flop 604, which is clocked by the PH1 core clock signal. The D input of flip-flop 604 is coupled to the output of AND gate 603. One input to AND gate 603 is coupled to new bus cycle indication signal. The other input to AND gate 603 is coupled to the output of inverter 602. The input of inverter 602 is coupled to the 2×/1× mode indication signal. The output of OR gate 609 is the "prepare for T2 transition" logic signal.

The 2×/1× signal controls the outputs of AND gates 601 and 603. When the 2×/1× signal is low, indicating that the processor is in 1× mode, the output of AND gate 603 is enabled, via inverter 602, and the output of AND gate 601 is disabled. When the 2×/1× signal is high, indicating that the processor is in 2× mode, the output of AND gate 601 is enabled and the output of AND gate 603, via inverter 602 is disabled. Thus, AND gates 601 and 608 in conjunction with flip-flops 605–607 comprises the 2× path for logic 600, while AND gate 603, inverter 602 and flip-flop 604 form the 1× path.

If the 2×/1× signal indicates that the processor is operating in 1× mode, the output of AND gate 603 will be high when a new bus cycle occurs (as indicated by the new bus cycle input to AND gate 603). The new bus cycle signal is a function of the PH2 core clock signal. Thus, when the new bus cycle occurs, the D input to flip-flop 603 is high. When the D input to flip-flop 603 is high, the Q output of flip-flop 603 goes high after the next assertion of the PH1 core clock signal. The Q output of flip-flop 603 represents the T1 state during the 1× mode of operation. The Q output always being high causes the output of OR gate 609 to be high. Thus, in the 1× mode, the "prepare for T2 transition" signal is always high.

If the 2×/1× signal indicates that the processor is operating in 2× mode, then the output of AND gate 601 is high. The output of AND gate 601 is received into the D input of flip-flop 605 and causes the Q output (at node A) to change state when the CLKOUT and PH1 signals are asserted. The output of flip-flop 605 propagates through flip-flops 606 and 607 on successive assertion of the PH2 and PH1 clock signals respectively. Until the Q output of flip-flop 607 (at node C) goes high, the output of AND gate 608 will be low. Thus, when the Q output of flip-flop 605 propagates through flip-flops 606 and 607, then the output of AND gate 608 will go high. The output of AND gate 608 being high represents the T1 END bus state. The high output of AND gate 608 also causes the output of OR gate 609 to go high, such that the "prepare for T2 transition" logic signal is high.

FIG. 7 illustrates one embodiment of the "unmask readys" holdoff logic. Referring to FIG. 7, logic 700 comprises D flip-flops 701, 703, 705 and 706, AND gates 702, 707 and 709, inverters 704 and 710 and OR gate 708. The T2 state signal is coupled to one input of AND gate 702. The other input to AND gate 702 is coupled to the output of inverter 704. The output of AND gate 702 is coupled to the D input of flip-flop 703, which is clocked by the PH2 core clock signal. The Q output of flip-flop 703 is coupled to the D input of flip-flop 705, which is clocked by the PH1 core clock signal. The Q output of flip-flop 705 is coupled to the input of inverter 704 and the D input of flip-flop 706, which is clocked by the PH2 core clock signal. The Q output of flip-flop 706 is coupled to one input of AND gate 707. The other input to AND gate 707 is coupled to the 2×/1× mode indication signal. The output of AND gate 707 is coupled to one input of OR gate 708. The other input to OR gate 708 is coupled to the output of AND gate 709. The inputs to AND gate 709 are coupled to the output of inverter 710 and the Q output of flip-flop 701, which is clocked by the PH2 core clock signal. The input of inverter 710 is coupled to the 2×/1× mode indication signal. The input of flip-flop 701 is coupled to the T2 state signal. The output of OR gate 708 is the "unmask readys" signal.

The "unmask readys" logic 700 generates the "unmask readys" signal. The 2×/1× mode selection signal controls which source input drives the output of OR gate 708, which is the "unmask readys" logic signal. If the 2×/1× mode selection signal indicates that the processes is in 1× mode, the output of AND gate 707 will be disabled and the output of AND gate 709 will be enabled, via inverter 710. If the 2×/1× mode selection signal indicates that the processor is operating in 2× mode, then the output of AND gate 707 will be enabled and the output of AND gate 709 will be disabled, via inverter 710. Thus, the 2×/1× mode selection signal indicates whether the output of OR gate 708 will be derived from flip-flop 701 or from the combination of AND gate 702, inverter 704 and flip-flops 703, 705 and 706.

If the 2×/1× signal is low, indicating that the processor is in 1× mode, then the "unmask readys" signal will be high whenever the Q output of flip-flop 701 is high. When the bus state machine transitions into the T2 state, the T2 signal is asserted. Note that the T2 signal is a function of the PH1 core clock signal. When the next PH2 core clock signal is asserted, the high T2 input causes the Q output of flip-flop 701 to go high, such that while the bus state machine is in state T2 the output of OR gate 709 is high. Thus, the "unmask readys" signal is high.

If the 2×/1× signal is high, indicating that the processor is in 2× mode, then the "unmask readys" signal will be high whenever the Q output of flip-flop 706 is high. The output of flip-flop 706 is high when its D input is high and the PH2 core clock signal is asserted. The D input of flip-flop 706 will be high when the output of AND gate 702 is high and a PH2 and PH1 clock pulses are asserted in succession by flip-flops 703 and 705. The output of AND gate 702 is high when the T2 signal is high and when the output of inverter 704 is high. Before the bus state machine transitions into the T2 state, the output of flip-flop 705 is low, such that the output of inverter 704 is high. Thus, when the bus state machine transitions into the T2 state and the T2 signal goes high, the output of AND gate 702 goes high. Then after the assertion of the PH2, PH1 and PH2 core clock signals in succession, the high output from AND gate 702 propagates through flip-flops 703, 705 and 706 respectively, thereby causing the output of OR gate 708 to go high. In this manner, the "unmask readys" signal is asserted.

Note, however, that once the signal propagates through flip-flop 705, the output of inverter 704 goes low, thereby causing the output of AND gate 702 to go low. When this occurs, the "unmask readys" signal will go low after successive PH2, PH1 and PH2 core clock pulses. The feedback from the output of flip-flop 705 to the input of AND gate 702, via inverter 704, is required when multiple back to back T2 states occur, such as during burst cycles.

In the currently preferred embodiment, the holdoff signal is generated by a holdoff generator in the bus controller. In the currently preferred embodiment, the holdoff signal asserts when CLKOUT is asserted and remains asserted for two core clock phases. This prevents the bus controller from transitioning prematurely. FIG. 8 illustrates a bus state diagram for the 2× mode. Referring to FIG. 8, Ti ADDRESS and T1 END represents the idle state when the bus is idle. The bus state machine transitions from the Ti ADDRESS state to the Ti END state when the second core PH1 clock signal of the current cycle has started. The bus state machine transitions from the Ti END state to the T1 ADDRESS state at the start of the first clock cycle of a bus cycle when a request for the bus is pending. During the T1 ADDRESS state, the addresses are driven out from the processor when the CLKOUT bus clock signal goes high. The bus state machine transitions to the T1 END state when the second core PH1 clock signal of the current clock cycle has started. During the T1 END state, the bus controller sets up for a transition into state T2. The bus state machine transitions between the T1 END state and the T2 DATA State at the start of the second or subsequent clock cycles of a bus cycle. In the T2 DATA state, if the bus cycle is a write cycle, then the data is driven onto the computer system bus when the CLKOUT bus clock signal transitions. The bus state machine transitions from the T2 DATA state to the T2 END state when the second core PH1 clock of the current clock cycle has started. During the T2 END state, if the bus cycle is a read cycle, the data is returned from the system bus during the CLKIN bus clock. Also, during the T2 END state, the ready signals are unmasked and sampled. If a ready signal is asserted and no bus request is pending, then the state machine transitions from the T2 END state to the Ti Address state. If a ready signal is asserted and a request is pending, then the bus state machine transitions from the T2 END state to the T1 ADDRESS state.

In the currently preferred embodiment, the holdoff generator is activated using the 1×/2× signal. In the currently preferred embodiment, an AND gate enables and disables the holdoff generator using the 1×/2× selection signal, wherein the AND gate outputs a logical zero when processor 200 is in 1× mode, which disables the holdoff signal.

Overview of the Clock Generator of the Present Invention

In the currently preferred embodiment of the present invention, the clock generator includes a phase locked loop (PLL), as shown in FIGS. 9A and 9B. The PLL generates the core clock signals, PH1 and PH2, and the bus clock signals, CLKOUT and CLKIN. In the currently preferred embodiment, the PLL is a 4× phase locked loop which is capable of generating the PH1 and PH2 core clock signals at one time or two times the frequency of the bus clock signals (and the external clock input signal). Although the PLL in the currently preferred embodiment is capable of generating core clock signals at twice the frequency of the bus clock signals, using the same techniques and mechanisms, the PLL could be configured to provide core clock signals at frequencies which are multiples (2×, 3×, 4×, etc.) of the bus clock signals.

Referring to FIGS. 9A and 9B, clock generator circuitry 900 comprises input buffers 901A and B, frequency phase detector 902, charge pump 903, loop filter 904, voltage-controlled oscillator (VCO) 905, a divide-by-two circuit 906, delays 907A-D and 912, D flip-flops 908A and 908B, inverter 915, OR gates 909A and 909B, AND gates 910A, 910B and 911, inverter 913, and PH2/PH1 circuitry 914.

Input buffers 901A and B buffer the signals on their inputs and output the signals in inverted form. The purpose of the buffers is to align the positive edges of their input signals so that frequency phase detector 902 can determine the phase difference between the two signals. Phase detector 902 only examines the buffered negative edges of the signals. The input of input buffer 901A is coupled to the input clock, CLK. In the currently preferred embodiment, CLK is a 33 MHz input to the processor from an external clock source. The output of buffer 901A is coupled to the REFCLK input of frequency phase detector 902. The input to input buffer 901B is coupled to delay 912. The input represents the feedback signal for the PLL in clock generator 900. The output of buffer 901B is coupled to the Feedback input of frequency phase detector 906.

Phase detector 902 compares the input frequencies from input buffers 901A and B and generates an output that is the measure of the phase difference between the signals. Phase detector 902 has two outputs. The ADJUP output is coupled to one of the inputs of charge pump 903. The ADJDWN output is coupled to the other input of charge pump 903. The ADJUP and ADJDWN outputs are generated when the edges of the feedback signal CLKINN lags or leads the edges of the CLK signal respectively.

Charge pump 903 is coupled to loop filter 904 and the VCNTL input of VCO 905. Charge pump 903 generates a charging or discharging current and supplies it to the capacitive elements of loop filter 904 in response to the ADJUP or ADJDWN pulses from phase detector 902 respectively. This current charges or discharges the capacitive elements in loop filter 904, generating a control voltage. The control voltage indicates the extent of difference between the input frequency of CLK signal and the feedback signal CLKINN. The control voltage is coupled to the VCNTL input of VCO 905.

VCO 905 receives the control voltage and an enable signal EN and produces VCOOUT. The VCOOUT output of VCO 905 is coupled to the CLK input of divide-by-two 906.

VCO 905 is enabled when the computer system is powered up. When enabled, VCO 905 generates a frequency VCOOUT in response to the control voltage. If the frequency of the CLK signal does not equal the frequency of the feedback signal CLKINN, the frequency generated by VCO 905 deviates in the direction of the frequency of the CLK signal.

Divide-by-two 906 produces two outputs, PA and PB. These outputs are half the frequency of the output VCOOUT of VCO 905 and are non-overlapping pulses. The outputs PA and PB are coupled to delays 907B and 907D respectively. In the currently preferred embodiment, delays 907B and 907D comprise inverters. The output of delay 907B is coupled to delay 907A, one of the inputs to AND gate 910A, and the clock inputs to D flip-flops 908A and B. The output of delay 907D is coupled to the input of delay 907C and one of the inputs of AND gate 910B. In the currently preferred embodiment, delays 907A-D comprise inverters.

D flip-flop 908A generates a Q output in response to being clocked by the PA output signal of divide-by-two 906 that is buffered through delay 907B. The Q output of D flip-flop 908A is coupled to one input of OR gate 909A. The other input of OR gate 909A is coupled to the MODE signal. The Q output of D flip-flop 908B is coupled to the input of inverter 915. The output of inverter 915 is coupled to the D input of D flip-flop 908A. The Q output of D flip-flop 908A is also coupled to D input of D flip-flop 908B.

The Q output of D flip-flop 908B is also coupled to one of the inputs to OR gate 909B. The other input to OR gate 909B is coupled to the MODE signal. The outputs of OR gate 909A and 909B are coupled to inputs of AND gates 910A and 910B respectively. The output of AND gate 910B is the CLKOUT signal. The output of AND gate 910A is coupled to one of the inputs of AND gate 911. The other input of AND gate 911 is coupled to the output of inverter 913. The output of AND gate 911 is the CLKIN signal. The output of AND gate 911 is also coupled to the input of delay 912. In the currently preferred embodiment, delay 912 comprises a series of inverters. The output of delay 912 is inverted and coupled to the input of buffer 901B.

The outputs of delays 907A and 907C are the EPH2 and EPH1 inputs, respectively, to PH1/PH2 circuitry 914, which produces the core clock phase signal, PH2, and the core clock phase signal, PH1. Referring to FIGS. 9A and 9B, the EPH2 input is coupled to the input of inverter 914F and the gate of p-channel transistor 914A. The source of transistor 914A is coupled to Vcc. The drain of transistor 914A is coupled to the gate of p-channel transistor 914B, the drain of transistor 914D and the source of transistor 914C. The gate of transistor 914D is coupled to Vcc, and the source is coupled to the PH1 output. The gate of transistor 914C is coupled to ground and its drain is coupled to the PH1 output. The source of transistor 914B is coupled to Vcc and its drain is coupled to the PH2 output and the drain of n-channel transistor 914E. The gate of transistor 914E is coupled to the output of inverter 914F. The source of transistor 914E is coupled to ground. The EPH1 input is coupled to the input of inverter 914I and the gate of p-channel transistor 914G. The source of transistor 914G is coupled to Vcc. The drain of transistor 914G is coupled to the gate of p-channel transistor 914H, the drain of transistor 914J and the source of transistor 914I. The gate of transistor 914J is coupled to Vcc, and the source is coupled to the PH2 output. The gate of transistor 914I is coupled to ground and its drain is coupled to the PH2 output. The source of transistor 914H is coupled to Vcc and its drain is coupled to the PH1 output and the drain of n-channel transistor 914K. The gate of transistor 914K is coupled to the output of inverter 914I. The source of transistor 914K is coupled to ground. The purpose of circuitry 914 is to ensure that the PH2 and PH1 signals do not overlap. Functionally, circuitry 914 allows one signal to go low before the other goes high. The operation of this implementation is well-known in the art.

Operation of the Clock Generation Circuitry of the Present Invention

In the present, clock generation circuitry 900 produces core clock signals, PH2 and PH1, and bus clock signals, CLKIN and CLKOUT, in response to an input CLK signal (i.e., EFI). The CLK signal is received into clock generator 210 of processor 200 (FIG. 2). The signal is buffered by input buffer 901A and enters phase detector 902 with the buffer feedback signal CLKINN (also buffered). Phase detector 902 outputs either an adjust up, ADJUP, or an adjust down, ADJDWN, signal. Charge pump 903 receives the signals and generates a charging or discharging current and supplies it to the capacitive elements of loop filter 904. This current charges or discharges the capacitive elements in loop filter 904, generating a control voltage. The control voltage produced is coupled to the VCNTL input to VCO 905.

The control voltage drives the output of VCO 905. As the control voltage increases, the frequency output by VCO 905 gets higher. As the control voltage decreases, the frequency output by VCO 905 gets lower. The output of VCO 905 is input into divide-by-two 906. Divide-by-two 906 divides the output frequency of VCO 905 to produce two outputs, PA and PB, wherein every rising edge of the CLK signal produces an edge, both rising and falling, for the output signal. These outputs are half the frequency of the output VCOOUT of VCO 905 and are non-overlapping pulses.

The PA and PB signals are the drivers for the PH2 and PH1 core clock signals respectively. The PA signal is delayed by delays 907B and 907A and is then input into control circuitry 930. The PB output signal is delayed by delay 907D and then is input into control circuitry 930. Control circuitry 930 outputs the EPH2 and EPH1 inputs to PH1/PH2 circuitry 914. The outputs of circuitry 914 are the core clock signals, PH2 and PH1.

The PA output, essentially the PH2 signal as output from delay 907B, produces the feedback signal CLKINN for clock generation circuitry 900 through AND gates 910A and 911 and delay 912. The feedback signal is the CLKIN signal produced by clock generation circuitry 900. When the PLL is in lock, the high going edges of the CLK signal and the CLKINN signal will be coincident. Upon chip power-up, the control voltage VCNTRL causes the VCO frequency to increase until the frequency of occurrence of the positive edges of the two inputs CLK and CLKINN to frequency/phase detector 502 are equal. The closed loop adjustment of the VCO frequency continues until the phase-error between the occurrence of the positive edges of CLK and CLKINN is at a minimum. The PLL is then in lock.

The AND gate 910A acts to either "swallow" the feedback signal or allow it to pass through depending on its input from OR gate 909A. During 2× mode, AND gate 910A (and AND gate 910B) masks every other clock signal. Therefore, the feedback signal being input into AND gate 911 is one-half the frequency of the feedback signal, i.e. one-half the frequency of the PH2 core clock signal during 2× mode. Inverter 913 is the other input to AND gate 911 and allows the feedback signal to pass through AND gate 911 when the PH1 signal, which is from the PB output of divide-by-two 906 buffered by delay 907D, is low. This ensures proper timing between the core clock signals and the bus clock signals.

The output of AND gate 911 is the CLKIN signal. In 1× mode, since the feedback signal is allowed to pass through AND gate 910A, the CLKIN signal is the same frequency as the PH2 core clock signal (and the PUPH2 core clock signal). In 2× mode, since every other pulse of the feedback signal is masked, the CLKIN signal is one-half the frequency of the PH2 core clock signal. This is also the same relationship between the CLKOUT signal and the PH1 core clock signal (and PUPH1 core clock signal), as output by AND gate 910B.

The CLKIN signal, i.e. the feedback signal, is delayed by delay 912 and fed back through the PLL by input buffer 901B. In 2× mode, since the feedback frequency is one-half the input CLK signal, charge pump 903 and loop filter 904 produce more voltage to compensate for the large difference between the frequencies of the CLK and CLKIN signals. The large control voltage produced causes VCO 905 to generate a higher frequency. A higher frequency from 905 produces PH1 and PH2 core clock signals that are higher in frequency. In this manner, the PH1 and PH2 core clock signals are generated by the present invention at twice (2×) the frequency of the CLK signal.

The operation of AND gate 910A is controlled by the output of OR gate 909A. Similarly, the operation of AND gate 910B is controlled by the output of OR gate 909B. When the outputs of OR gates 909A and 909B are low, then the outputs of AND gates 910A and 910B are low, thereby masking the clock signals received on their other inputs. When the outputs of OR gates 909A and 909B are high, then the other inputs of AND gates 910A and 910B are allowed to pass freely (with the exception of a small gate delay), such that the clock signals are not masked.

The outputs of OR gates 909A and 909B are controlled by each of their two inputs. One of the inputs to OR gates 909A and 909B are the Q outputs of D flip-flops 908A and 908B respectively. Furthermore, both OR gates 909A and 909B receive the MODE signal which sets the phase locked loop of clock generation circuitry 900 in its mode. In other words, the MODE signal permits the PLL to operate in 1× mode or another mode which produces core clock signals which have a frequency that is a multiple of the bus clock signals (i.e., 2×, 3×, 4×, etc.). In the currently preferred embodiment, the MODE signal selects either the 1× mode or the 2× mode. In the currently preferred embodiment, when the MODE signal is high (i.e., a logical 1), clock generation circuitry 900 is placed into 1× mode, and when the MODE signal is low (i.e., a logical 0), clock generation circuitry 900 is placed into 2× mode.

When clock generation circuitry 900 is in 1× mode, the output of OR gate 909A is always a logical 1. A logical 1 output from OR gate 909A causes the feedback signal to be passed through AND gate 910A without being masked. Moreover, the PB signal is passed through AND gate 510B as the CLKOUT signal. In this situation, the CLKOUT and CLKIN signals are the same frequency as the PH1 and PH2 core clock signals. Thus, the bus (FIG. 1) operates at the same frequency as the core of the processor (FIG. 2).

When clock generation circuitry 900 is switched into 2× mode, the output of OR gates 909A and 909B is determined by the output of D flip-flops 908A and 908B respectively. When the output of D flip-flop 908A is a logical 1, a logical 1 appears at AND gate 910A and allows the feedback signal to pass. When the output of D flip-flop 908A is a logical 0, a logical 0 appears at AND gate 910A, and AND gate 910A masks the feedback signal, thereby preventing it from passing through the gate. Similarly, when the output of D flip-flop 908B is a logical 1, a logical 1 appears at AND gate 910B and allows the output of the CLKOUT signal, and when the output of D flip-flop 908B is a logical 0, a logical 0 appears at AND gate 910B, and AND gate 910B masks the CLKOUT signal, thereby preventing it from passing through.

D flip-flops 908A and 908B are added as a second divide-by-two master/slave flip-flop. D flip-flops 908A and 908B are added off phase so that it is not in the critical path. The output of delay 907B clocks both D flip-flops 908A and 908B. However, the output of delay 907B clocks D flip-flops 908A and 908B on alternating clock pulses by having the clock input to D flip-flop 908A inverted upon receipt. Therefore, every other clock pulse of the output of delay 907B produces a logical 1 (or 0) output from D flip-flop 908A, while on the other clock pulses the output of delay 907B produces a logical 1 (or 0) output from D flip-flop 908B. Note that D flip-flops 908A and 908B produce alternating 1 and 0 outputs by being coupled with a feedback loop through inverter 915. When the D input of D flip-flop 908A is a 1 and D flip-flop 908A receives a low clock pulse (i.e., no clock signal) from delay 907B, its Q output is a 1. This Q output is then input into the D input of D flip-flop 908B, such that upon the next clock pulse, its Q output will be a 1. The Q output of 1 from D flip-flop 908B is inverted by inverter 915 and input to the D input of D flip-flop 908A, such that when the next clock pulse occurs, D flip-flop 908A will output a 0. The Q output of 0 is then feed into D flip-flop 908B. This feedback cycling is continuous.

Therefore, when clock generation circuitry 900 is in 2× mode, every other clock pulse of the output of delay 907B produces a logical 1 output from OR gate 909A, preventing AND gate 910A from allowing the feedback signal to pass through AND gate 910A. Furthermore, in this situation, AND gate 910B prevents the PB signal from passing through it as the CLKOUT signal. Therefore, both the CLKOUT and CLKIN signals are at half the frequency of the PH1 and PH2 core clock signals because half of the signal pulses are masked. However, even though they are half the frequency, the timing of the signals is exactly the same because the rising and falling edges of the bus clock signals, CLKIN and CLKOUT, are aligned with rising and falling edges of the core clock signals, PH2 and PH1, respectively. Thus, in the currently preferred embodiment, the core of the processor (FIG. 2) is allowed to operate at twice the speed of the bus without changing the timing and without additional interface circuitry.

FIG. 10 illustrates timing signals associated with the operation of the clock generation circuitry 900. The use of the divide-by-two master/slave flip-flop (D flip-flops 908A and 908B) and the two AND gates (910A and 910B) provides the pulse-swallower functionality utilized by the present invention to generate the 2× core clock signals. The divide-by-two master/slave flip-flop generates the inhibit signals INH1 and INH2 that act as pulse swallowers for every other CLKOUT and CLKIN. In the currently preferred embodiment, this causes the VCO frequency VCOOUT to be 4× that of the input clock frequency (i.e., EFI). Note that in FIG. 10, the CLKOUT and CLKIN signals are quarter duty cycle and have a correct timing relationship with the core clock signals.

Selecting the Operating Mode of the Processor

In the present invention, the clock control signal (FIG. 2) selects the operating mode of the processor. In the currently preferred embodiment, the state of the clock control signal may be set to either of two conditions, (i.e., logic states). In the currently preferred embodiment, if the clock control signal is in one state, then the processor operates in 1× mode, wherein the core of the processor operates at the same frequency as bus transfers occur on the bus of the computer system; however, if the clock control signal is in another state, then the core of the processor operates at a frequency that is a multiple of the frequency of the bus of the computer system.

The condition of the clock control signal may be selected in numerous ways. In one embodiment, the condition is selected through wire bonding. An example of a wire bond is shown in FIG. 11. Referring to FIG. 11, in wire bonding, a bond wire 110 makes an electrical connection between the die 112 and the package 114. The bonding areas on the die 112 are large square metal pad areas 116 located around the periphery of the die 112. Fine wires interconnect the bonding pads 116 on the integrated circuit die 112 to the leads 118 of the package 114. Each of the leads 118 of the package 114 is connected to Vcc, ground (Vss) or an external pin.

In the currently preferred embodiment, die 112 is formed in conjunction with other dies in a wafer using a metal-oxide semiconductor fabrication process in a well-known manner. Die 112 includes a CPU core area on its face for the CPU core, a bus control area on its face for the bus control and a clock generation area for the clock generator. Die 112 also includes a clock control line coupled to the clock generator for selecting the mode of the integrated circuit (i.e., either 1× mode, 2× mode, 3× mode, etc.)

In the present invention a single bond pad is electrically coupled to the clock control signal and, therefore, permits the selection of the 1× mode or a second mode in which the processor core operates at a frequency which is a multiple of the frequency of the bus. In the currently preferred embodiment, in the second mode, the processor core operates at 2×. Note that the bond wire may connect the single bond pad to either Vcc, ground or an external pin, as shown in FIG. 11 (by the solid and dotted bond wire lines). If the bond pad is electrically coupled to ground, then the processor is selected to operate in one mode, while if the bond wire electrically couples the bond pad to Vcc, the processor operates in another mode. When the bond wire electrically connects the bond pad to an external pin, the selection of the clock control signal is accomplished on the mother board of the computer system. That is, a switching device on the mother board could be employed to set the clock control signal to select a mode or the external pin could be either electrically grounded (Vss) or attached to a Vcc source on the mother board to select the mode.

Another method and mechanism for selecting the operating mode of the processor is through the use of tape-automated bonding (TAB) wherein the die is attached to leads supported by tape. The process to attach the die includes forming bumps, which are usually gold, on either the die or the tape. These bumps are used to bond the die to the leads on the tape. The gold bumps are formed by depositing a multiple layer metal sandwich, comprising a contact/barrier with a layer of gold (for oxidation protection), over the passivation oxide. Next, a photoresist is deposited and a window is created above the bonding pad. The opening is filled with gold by electroplating. The photoresist is then stripped away and then followed by etching, such that a gold bump stands above each pad. The mounting process aligns the tape over the die, wherein a heated bonding head presses the tape against the die, such that a thermocompression bond is formed. Such a TAB process is well-known in the art. By using a TAB process, the bond pad for selecting the mode of the processor may be coupled to Vcc, ground or an external pin.

Another mechanism and method for selecting the operating mode of the processor is by a metal option. That is, by using one of the metalization layer (e.g., the top metalization layer) and a mask, the present invention is able to route the clock contact signal to either Vcc or ground. The present invention employs a standard multilayer metalization process, wherein a mask is used when depositing one of the metalization layers, such that the clock control is routed to Vcc or ground. By routing the clock control signal to either Vcc or ground, the signal may be placed in one of two possible conditions so that the operating mode may be selected in a manner similar to the selection made by wire bonding.

An example of a metal option is shown in FIG. 12 wherein a bond wire 120 makes an electrical connection between the die 122 and the package 124. The bonding areas on the die 122 are square metal pad areas 126. Two of the bond pads 126A and 126B are coupled together in a permanent connection by one of the metalization layers (e.g., the top metalization layer) through the use of a masking step in a standard lithography process, which is well-known in the art. Bonding pad 126B is electrically coupled to one of the leads 128 of the package 124 using a fine wire. In the currently preferred embodiment, bonding pad 126B is designated for coupling to a grounded (Vss) lead or a sourced (Vcc) lead. Because of this designation, bonding pad 126A is coupled to either ground (Vss) or Vcc, such that the clock control is permanently coupled in the 1× mode or a mode in which the frequency of the core is at some multiple of the bus (e.g., double).

Another method and mechanism for selecting the operating mode is through software. In one embodiment, to select the operating mode using software, a register or other storage location, either on or off-chip, contains the necessary information, such as a control bit, that drives the clock control signal to select the operating mode. In one embodiment, the register could be located in the datapath of the processor and the control bit routed to the clock control signal input of the clock generation circuitry (FIGS. 9A and 9B). In another embodiment, the register could be located in the memory of the computer system (FIG. 1 ) and read by the processor as status to set the clock rate. The register could be loaded by the processor. In one embodiment, the register could be loaded through microcode. It should be noted that the operating mode may be changed when the selection is made through software. That is, the selection does not have to be permanent. Therefore, in the currently preferred embodiment, the processor may be switched between 1× and 2× mode. Note also that when switching between modes, the selection must be controlled such that the processor is in a halted state wherein the processor is inactive for a short period of time (e.g., a millisecond) so that the phase locked loop of the present invention may be resynchronized (i.e., attain lock). In one embodiment, a switch is made between operating modes when the processor is in reset, wherein a microcode reset routine would read the control bit(s) to select the operating mode.

Note also that in one embodiment wherein the operating mode is determined through software, a divide-by-two circuit is added at the outputs of the phase locked loop to divide down the output clock signals, instead of using the divide-by-two implementation employed in FIGS. 9A and 9B. By using an OR gate in conjunction with the additional divide-by-two, the control bit is able to enable and disable the divide-by-two, thereby causing the frequency of the clock signals output from the PLL. Therefore, the mode to be switched from 1× to 2× and vice versa.

The selectability of the present invention allows a single die to fulfill the requirements of a number of processor types. In other words, a processor designed according to the present invention has a core which selectively operates at a frequency substantially equal to that of the bus or at a frequency which is a multiple of the bus. The currently preferred embodiment of the processor of the present invention can be set to have a core which operates at double the frequency of the bus. Thus, the present invention allows a single integrated circuit to be set in one of two operating modes.

The present invention also permits a bond pad or metal option to select between the modes of operation. In this manner, a permanent (or fixed) electrical connection can be made to cause the selection of either one of two modes (e.g., a slow mode or a fast mode). Note also that this selectability can be transparent to the remainder of the computer system. That is, the frequency of the core (i.e., whether it operates at 1×, 2×, 3×, etc.) is not known by the remainder of the computer system.

Moreover, the present invention allows the selection of the operating mode of the core through the use of software. By allowing selection through software, the present invention is able to switch between either one of two modes. For instance, the processor of the present invention can switch between 1× and 2× modes and vice versa. In this manner, a processor can be switched into a mode which allows a processor (or integrated circuit) to perform a function or operation more quickly.

Whereas many alterations and modifications of the present invention will no doubt become apparent to a person of ordinary skill in the art after having read the foregoing description, it is to be understood that the particular embodiment shown and described by way of illustration are in no way intended to be considered limiting. Therefore, reference to the details of the preferred embodiments are not intended to limit the scope of the claims which themselves recite only those features regarded as essential to the invention.

A microprocessor which selectively operates at the same frequency or a multiple of the frequency of the computer system bus has been described.

We claim:

1. A microprocessor device formed in a single integrated circuit chip, comprising:

a CPU core that executes instructions in response to a core clock signal;

a bus interface unit that transfers data between external terminals of the microprocessor device and said CPU core, the bus interface unit transferring data in accordance with a bus clock signal;

a clock generator that receives a signal of a first frequency from a source external to the microprocessor and generates said core clock signal from said signal of said first frequency;

a clock control coupled to said clock generator and having a first condition and a second condition, said first condition causing said clock generator to produce said core clock signal at a second frequency which is a multiple of said first frequency, and said second condition causing said clock generator to produce said core clock signal at said first frequency.

2. The microprocessor device according to claim 1 wherein said clock control includes at least one external control pin, said at least one external control pin enabling receipt of an input from a source external to the microprocessor device to place the clock control into the first condition or the second condition.

3. The microprocessor device according to claim 1 wherein said clock control includes at least one bonding pad on said integrated circuit chip to permanently select the first condition or the second condition via at least one pin.

4. The microprocessor device according to claim 3 wherein the microprocessor device is housed in a package, and said at least one bonding pad is coupled to the package with wire bonding.

5. The microprocessor device according to claim 3 wherein the microprocessor device is housed in a package, and said at least one bonding pad is coupled to the package by tape-automated bonding.

6. The microprocessor device according to claim 1 wherein said clock control includes an metal pattern on a face of said integrated circuit chip wired in a first position to select said first condition and in a second position to select said second condition.

7. The microprocessor device according to claim 1 wherein the second frequency is double the first frequency.

8. A method of making microprocessors, each of said microprocessor being in the form of a single integrated circuit chip with interconnections on a face of said integrated circuit chip, said microprocessors including a first plurality of microprocessors with a first plurality of interconnections on said face of a first plurality of said integrated circuit chips and a second plurality of microprocessors with a second plurality of interconnections on said face of a second, different plurality of said integrated circuit chips, said method comprising the steps of:

forming a number of said integrated circuit chips, each of said integrated circuit chips having:
  a CPU core area containing a core that executes instructions, the core operating at a clock speed responsive to a core clock signal applied to said core;
  a bus control area containing a bus interface unit that transfers data between external terminals of said integrated circuit chip and said core, the bus interface unit operating at a clock speed responsive to a bus clock signal applied to said bus control area;
  a clock generator area containing a clock generator operable to receive a signal of a first frequency and to generate said core clock signal;
  a clock control coupled to said clock generator and having a first condition and a second condition, said first condition causing said clock generator to produce said core clock signal at a second frequency which is a multiple of said first frequency, and said second condition causing said clock generator to produce said core clock signal at said first frequency;

forming said first plurality of interconnections on said face of said first plurality of said integrated circuit chips to define said first condition of said clock control; and forming said second plurality of interconnections on said face of said second, different plurality of said integrated circuit chips to define said second condition of said clock control.

9. The method according to claim 8 wherein said step of forming said number of integrated circuit chips includes forming said integrated circuit chips on wafers having a large number of integrated circuit chips, then after said steps of forming said interconnections, dividing said wafers into separate integrated circuit chips.

10. A microprocessor device formed in a single integrated circuit chip for use in a computer system, comprising:

a CPU core that executes instructions in response to a core clock signal;

a bus interface unit that transfers data between external terminals of the microprocessor device and said CPU core, the bus interface unit transferring data in accordance with a bus clock signal;

a clock generator that receives a signal of a first frequency from a source external to the microprocessor and generates said core clock signal from said signal of said first frequency and said bus clock signal;

a clock control coupled to said clock generator and having a first condition and a second condition, said first condition causing said clock generator to produce said core clock signal at a second frequency which is a multiple of said first frequency, and said second condition causing said clock generator to produce said core clock signal at said first frequency, wherein the first and second conditions are derived from a storage area in the computer system.

11. The microprocessor device according to claim 10 wherein the storage area is external to the integrated circuit chip.

12. The microprocessor device according to claim 10 wherein the storage area is on the integrated circuit chip.

13. The microprocessor device according to claim 10 wherein the storage area comprises a control register.

14. The microprocessor device according to claim 13 wherein the control register comprises a control bit, wherein the first condition is generated in response to the control bit being in a first logic state and the second condition is generated in response to the control bit being in a second logic state.

15. The microprocessor device according to claim 10 wherein the storage area is programmed, such that either the first condition or the second condition is generated.

16. The microprocessor device according to claim 10 wherein the first or second condition is generated during a reset of the microprocessor device, such that the clock control causes the clock generator to produce said core clock signal at either the second frequency or the first frequency.

* * * * *

UNITED STATES PATENT AND TRADEMARK OFFICE
CERTIFICATE OF CORRECTION

PATENT NO.   :   5,537,581
DATED        :   July 16, 1996
INVENTOR(S)  :   Conary et al.

It is certified that error appears in the above-identified patent and that said Letters Patent is hereby corrected as shown below:

In column 12 at line 62 delete "9141." and insert --914l.--

In column 12 at line 64 delete "9141" and insert --914l--

Signed and Sealed this

Twenty-fifth Day of February, 1997

Attest:

BRUCE LEHMAN

*Attesting Officer*            *Commissioner of Patents and Trademarks*